Oct. 13, 1964    A. C. DUCATI    3,153,133
APPARATUS AND METHOD FOR HEATING AND CUTTING
AN ELECTRICALLY-CONDUCTIVE WORKPIECE
Filed Aug. 11, 1961
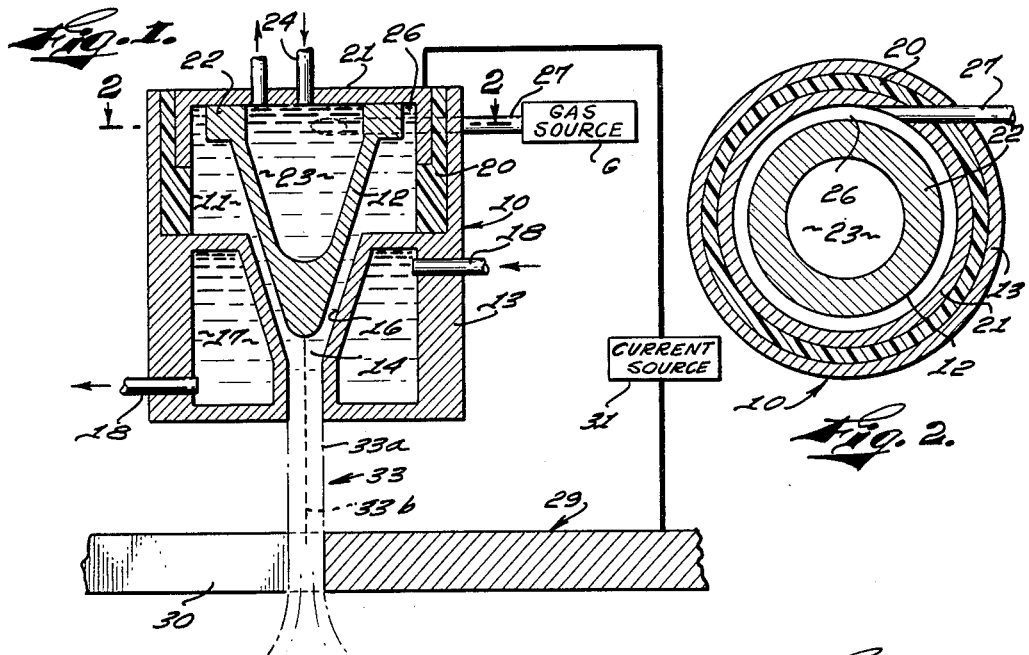
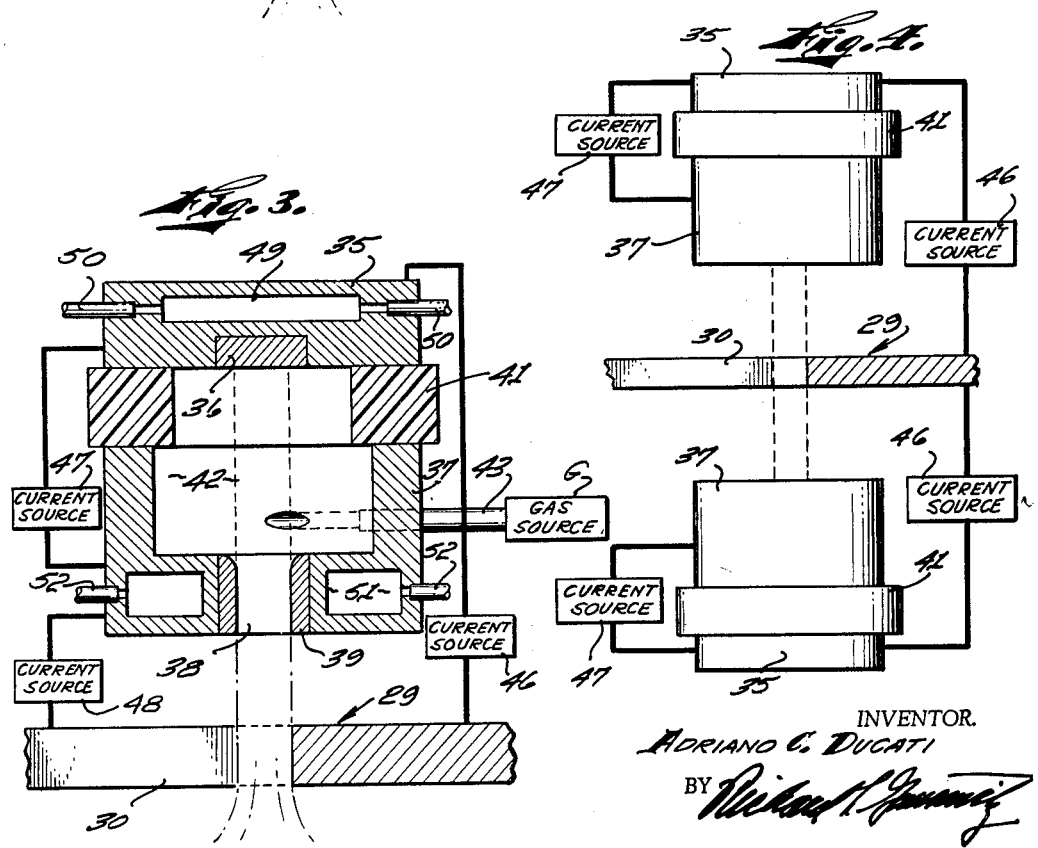
INVENTOR.
ADRIANO C. DUCATI
BY
ATTORNEY

United States Patent Office 3,153,133
Patented Oct. 13, 1964

3,153,133
APPARATUS AND METHOD FOR HEATING AND CUTTING AN ELECTRICALLY-CONDUCTIVE WORKPIECE
Adriano C. Ducati, Newport Beach, Calif., assignor, by mesne assignments, to Giannini Scientific Corporation, Amityville, N.Y., a corporation of Delaware
Filed Aug. 11, 1961, Ser. No. 129,217
5 Claims. (Cl. 219—121)

This invention relates to an apparatus and method for heating an electrically-conductive workpiece. More specifically, the invention relates to an apparatus and method for cutting a metal workpiece through use of a gas-stabilized electric arc of the transferred type.

An object of the present invention is to provide an apparatus and method for heating and cutting a metal workpiece by means of an electric arc which is in circuit with such workpiece, the arc being stabilized and constricted through use of a vortically-flowing gas.

A further object of the invention is to provide a method of heating and cutting a workpiece through use of a gas-stabilized arc which passes from a back electrode to a workpiece, and also through use of a second arc which passes from a nozzle electrode to the workpiece.

Another object is to provide an apparatus and method for cutting a workpiece through use of electrical plasma-jet torches adapted to direct jets of high-temperature plasma against opposite sides of the workpiece, at least one electrode of each torch being in circuit with the workpiece whereby the workpiece is a primary electrode relative to both torches.

These and other objects and advantages of the invention will be more fully set forth in the following specification and claims, considered in connection with the attached drawing to which they relate.

In the drawing:
FIGURE 1 is a schematic vertical sectional view illustrating an electrical plasma-jet torch as employed in effecting transferred-arc cutting of a metal workpiece;

FIGURE 2 is a section taken on line 2—2 of FIGURE 1 and illustrating the tangential introduction of gas into the vortex chamber in the torch;

FIGURE 3 is a schematic sectional view showing a different torch employed in the transferred-arc cutting of a workpiece, and illustrating additional current sources; and FIGURE 4 is a schematic view, primarily in elevation, illustrating two torches positioned to direct plasma jets against opposite sides of a workpiece, such workpiece being in circuit with at least one electrode of each torch.

Referring first to the embodiment shown in FIGURES 1 and 2, an electrical plasma-jet torch is illustrated to comprise wall means 10 to define an annular vortex chamber 11 in which is disposed a generally conical back electrode 12 formed of tungsten or the like. The illustrated wall means 10 includes a generally cup-shaped metal element 13 the bottom wall of which is relatively thick, such bottom wall having a nozzle passage or opening 14 formed centrally therein.

Nozzle passage 14 has a conical portion which is generally coconical with the tip portion of back electrode 12, the wall 16 of the conical portion being spaced outwardly from the back electrode to provide a channel or passage through which gas may flow vortically. The illustrated nozzle passage 14 also has a cylindrical downstream portion which communicates coaxially with the narrow end of the conical portion. The wall of the nozzle passage is cooled through use of a chamber 17 formed in the bottom portion of element 13, such chamber containing water or other coolant which is passed therethrough by suitable conduit means 18.

The wall means 10 also comprises a sleeve 20 formed of a suitable insulating material and inserted into the upper portion of the cup-shaped element 13. The upper portion of the sleeve is suitably formed, as by counter-boring, to receive the downwardly-extending rim of a second cup-shaped metal element 21, the latter forming the upper wall of vortex chamber 11.

A flange 22 at the base of back electrode 12 is suitably secured to the center portion of the second cup-shaped element 21. Thus, a second coolant chamber 23 is formed within the back electrode, which is hollow except at the tip, so that cooling water may be circulated therethrough by means of conduits 24.

The flange 22 on the back electrode has a cylindrical peripheral wall which is coaxial with the axis of the back electrode and is spaced radially-inwardly from the interior wall of the second cup-shaped element 21. As best illustrated in FIGURE 3, gas is introduced tangentially into the resulting annular space 26 for annular flow therearound and thence for vortical flow in the vortex chamber 11 and the communicating nozzle passage or opening 14. A conduit 27 is employed to introduce gas tangentially into the annular space 26, such conduit communicating with a gas source which is schematically represented at G. Gas source G may be adapted to supply nitrogen, hydrogen, argon, and various other gases or mixtures of gases, at a sufficient pressure to effect rapid vortical flow in the vortex chamber 11 and in the nozzle passage or opening 14.

The electrically-conductive workpiece is shown as comprising a metal plate 29 which is disposed a suitable distance from the adjacent surface of cup-shaped element 13, the kerf portion of the workpiece being indicated at 30. A current source 31 is electrically connected to the workpiece and the second cup-shaped element 21, and thus to back electrode 12, so that an electric arc will be maintained between the workpiece and the tip of the back electrode. Current source 31 may comprise a D.C. source, or a suitable source of single-phase or multi-phase alternating current. Such source is adapted to deliver large currents, such as hundreds or thousands of amperes.

*Description of the Method, Embodiment of FIGURES 1 and 2*

Stated generally, the method comprises maintaining a high-current electric arc between a back electrode and a workpiece, and effecting gas-vortex stabilization of at least a portion of the arc in such manner that the arc is constricted, at at least one point along its length, to a cross-sectional area substantially smaller than it would normally occupy in space. Where the workpiece is to be cut, the arc voltage and power are so selected, and other parameters so adjusted, that the arc and associated gas or plasma effect severing of the plate 29 to form the kerf 30.

It is within the scope of the invention to adjust the parameters in such manner that the workpiece is not penetrated and cut but is instead heated to welding temperature, and to effect welding together of two plates (or other elements) by maintaining the arc in the region where the plates engage each other. In performing such welding, filler metal may be added to the weld puddle in stick, wire, powder or other form.

Stated more specifically, the method comprises introducing gas tangentially into an electrical plasma-jet torch to effect vortical flow of the gas therein, and maintaining a high-current electric arc between the back electrode of the torch and a workpiece, the arc being stabilized and constricted by the vortically-flowing gas and serving to effect either cutting or welding of the workpiece as indicated above. In the illustrated apparatus, the gas (such as nitrogen or hydrogen or a mixture thereof) is introduced from source G through conduit 27 into the annular space 26 around the flange 22 of the back electrode 12. The gas flows vortically in such space and in the vortex chamber 11, after which it flows vortically around the tip of the back electrode 12 and through passage or opening 14.

The vortically-flowing gas effects gas stabilization and constriction of the arc, that is to say the portion of the arc within passage 14 where the gas has sufficient pressure to effect adequate stabilization and constriction, in such manner that the cutting or welding operation is effected with a relatively high degree of efficiency.

The power of the arc and gas or plasma stream (indicated at 33 in FIGURE 1) is increased substantially as the result of the vortical flow of gas, in comparison to methods in which the gas flow is axial. Stated otherwise, the vortically-flowing gas has been found to produce the effect of increasing the voltage of the arc and thus the power of the arc and the efficiency thereof in cutting or welding the workpiece 29.

The electric arc is indicated at 33b in FIGURE 1, being gas stabilized along a straight line between the tip of back electrode 12 and the workpiece. The gas or effluent which surrounds the arc is indicated at 33a, such gas being extremely hot due to heating thereof by the arc in the nozzle passage or opening 14.

Since the conical wall 16 and the cylindrical wall of the downstream portion of passage 14 form a surface of revolution about the axis of back electrode 12, the method of the invention may also be stated in terms of providing such a surface about the arc and effecting vortical flow of gas in the chamber or passage defined by such surface.

*Embodiment of FIGURE 3*

In the embodiment of FIGURE 3, the torch is illustrated to comprise a disc-shaped back electrode 35, which may be formed of copper or other conductor, having a central insert 36 of tungsten or other refractory metal. A generally cup-shaped front or nozzle electrode 37 (formed of copper or the like) is provided in spaced coaxial relationship relative to the back electrode, such front electrode having in its bottom wall a cylindrical nozzle passage or opening 38 the wall of which may be protected by a sleeve 39 of tungsten.

A ring 41 of refractory insulating material is provided between the peripheral portion of back electrode 35 and the rim of the cup-shaped electrode 37, such ring being suitably adapted (as by means of fasteners, not shown) to maintain the back and front electrodes in assembled relationship.

The interior side walls of the insulating ring 41 and of front electrode 37 are cylindrical about the axis of nozzle passage or opening 38, so that a vortex chamber 42 is provided. Gas is introduced tangentially into such chamber through a conduit 43 communicating with a gas source G. Gas source G is adapted to introduce nitrogen, hydrogen, or other suitable gas into vortex chamber 42 at a high velocity, so that the gas forms a vortex therein. A low-pressure canal extends through the vortex, along the axis of the vortex chamber and through the opening 38. The various parameters are so adjusted that the gas-pressure gradient at the canal-defining wall formed by the vortically-flowing gas is high, so that the gas operates to constrict the electric arc as well as stabilize the same.

A first current source 46 adapted to deliver A.C. (single or multi-phase) or D.C. in substantial amounts, for example hundreds of amperes, is provided and is connected between back electrode 35 and the work 29. A second current source 47 is connected between back electrode 35 and front electrode 37, whereas a third current source 48 is connected between the front electrode and the work. The second and third current sources may deliver D.C. or A.C., single or multi-phase. It is to be understood that the second and third current sources 47 and 48 need not be employed simultaneously since in certain operations either or both may be omitted. It is also to be understood that sources 47 and 48 may be employed in the embodiment of FIGURES 1 and 2.

A first coolant chamber 49 is provided in back electrode 35, adjacent insert 36, to effect cooling thereof when water is passed through the chamber by means of suitable conduits 50. Correspondingly, an annular coolant chamber 51 is provided in the bottom wall of nozzle electrode 37, around sleeve or insert 39, to effect cooling thereof when water is passed through the chamber via conduits 52.

*Description of the Method, Embodiment of FIGURE 3*

In performing the method through use of current source 46 only, an electric arc is initiated between insert 36 and workpiece 29, such arc extending axially through the vortex chamber 42 and through nozzle opening 38. The vortically-flowing gas from source G effects stabilization and constriction of the arc both in chamber 42 and in passage or opening 38, so that the arc has a relatively high voltage and thus power as described previously relative to the embodiment of FIGURES 1 and 2. The arc, and the gas effluent heated thereby, may be employed to effect either cutting or welding of the workpiece 29, the illustrated embodiment relating to a cutting operation wherein the kerf 30 is formed.

Application of the current source 47 effects maintenance of an additional arc between back electrode insert 36 and the insert 39 in the front electrode, such additional arc adding power which raises the temperature of the effluent. In applications where the current source 47 is a D.C. source, it may be employed with an A.C. current source 46 to prevent extinguishment of the arc when the A.C. wave passes through zero.

Application of the third current source 48, which may be adapted to deliver very large amounts of current, causes maintenance of an additional arc between insert 39 and workpiece 29 and adds greatly to the power so that the cutting or welding rate is increased.

*Embodiment of FIGURE 4*

In the embodiment of FIGURE 4, two torches of the type described relative to FIGURE 3 (or of other types such as described relative to FIGURE 1) are employed on opposite sides of the workpiece 29. Current sources 46 and 47 are shown as being connected the same as in FIGURE 3. In addition, current sources corresponding to sources 48 (FIGURE 3) may be connected between each nozzle electrode and the workpiece. It is to be understood that a suitable gas source, not shown, is adapted to introduce gas tangentially into the vortex chamber in each torch. Each torch is identical, in the present illustration, to the one described relative to FIGURE 3.

The utilization of two torches on opposite sides of the workpiece 29 not only increases the heat and the cutting speed but also causes the resulting cut to be cleaner and free of ridges or the like. Furthermore, relatively thick plates may be cut in a single pass.

Various embodiments of the present invention, in addition to what has been illustrated and described in detail, may be employed without departing from the scope of the accompanying claims.

I claim:
1. A method of heating a metal workpiece, which comprises providing an electrical plasma-jet torch having a back electrode and a nozzle electrode, effecting flow of gas through said torch and out the nozzle opening in said nozzle electrode to the vicinity of a metal workpiece, maintaining a first high-current electric arc through said gas between said back electrode and said workpiece, and concurrently maintaining a second high-current electric arc through said gas between said nozzle electrode and said workpiece.

2. The invention as claimed in claim 1, in which said method further comprises maintaining a third high-current electric arc through said gas between said back electrode and said nozzle electrode.

3. Apparatus for heating an electrically-conductive workpiece, comprising a nozzle electrode having a nozzle passage therein, an elongated back electrode having an arcing tip disposed in said nozzle passage but set back from the forward end of said nozzle passage, means to effect flow of gas through said passage to the vicinity of an electrically-conductive workpiece, means to maintain a high-current electric arc through said gas between said back electrode and said workpiece, and means to maintain a second high-current electric arc through said gas between said nozzle electrode and said workpiece.

4. A method of cutting a metal plate, which comprises providing a back electrode at one point along a predetermined axis, providing a metal plate at another point along said axis opposite and spaced from said back electrode, providing electrically-conductive wall means to define a surface of revolution about said axis and extending at least a substantial part of the distance from said back electrode to said plate, effecting rapid vortical flow of gas about said axis in the space defined by said surface of revolution, connecting said back electrode and plate in circuit with a source of electric power, effecting flow of a large electric current from said source through said back electrode and said plate to maintain a high-current electric arc therebetween, said arc being stabilized along said axis by said vortically-flowing gas and serving to cut said plate, the voltage of said arc being raised by said vortically-flowing gas whereby to increase the efficiency of the cutting operation, and maintaining an additional electric arc along said axis between said plate and a portion of said wall means.

5. Apparatus for cutting an electrically-conductive workpiece, comprising a back electrode, an electrically-conductive nozzle element having a nozzle opening therein, means to define an annular chamber between said back electrode and nozzle element, the wall of said chamber being a surface of revolution about the axis of said nozzle opening, means to introduce gas tangentially into said chamber to effect rapid vortical flow of said gas about said axis, means to maintain a high-current electric arc through said chamber and said nozzle opening between said back electrode and an electrically-conductive workpiece, said arc being stabilized along said axis by said vortically-flowing gas, and means to maintain an additional electric arc between said nozzle element and said workpiece.

References Cited in the file of this patent
UNITED STATES PATENTS

| | | |
|---|---|---|
| 2,769,079 | Briggs | Oct. 30, 1956 |
| 2,806,124 | Gage | Sept. 10, 1957 |
| 2,922,869 | Giannini et al. | Jan. 26, 1960 |
| 3,004,189 | Giannini | Oct. 10, 1961 |
| 3,075,066 | Yenni et al. | Jan. 22, 1963 |
| 3,083,289 | Munro et al. | Mar. 26, 1963 |